United States Patent Office 3,457,232
Patented July 22, 1969

3,457,232
NOVEL METHYLOLATED ACRYLAMIDE TELOMER
Fujio Mashio and Atsushi Kusaga, Kyoto, Japan, assignors to Sumitomo Chemical Company, Ltd., Higashi-ku Osaka, Japan, a corporation of Japan
No Drawing. Filed Jan. 10, 1966, Ser. No. 519,424
Claims priority, application Japan, Jan. 14, 1965, 40/1,959
Int. Cl. C08f 3/90; D06m 15/12
U.S. Cl. 260—72                                     11 Claims

ABSTRACT OF THE DISCLOSURE

A telomer having the formula:

$$R^1-\underset{\underset{OH}{|}}{\overset{\overset{R^2}{|}}{C}}-\left(CH_2-\underset{\underset{CONH_2}{|}}{\overset{\overset{H}{|}}{C}}\right)_n-H$$

where $R^1$ and $R^2$ are hydrogen or $C_{1-12}$ alkyl and $n$ is 2–30 is obtained by telomerizing acrylamide in the presence of a large amount of alcohol in the absence of water. The telomer can further be methylolated and the thus methylolated telomer can be applied to a textile fabric.

---

The present invention relates to novel acrylamide resin and production of said resin.

One object of the present invention is to provide novel resin used for the processing of fabrics comprising fibers of natural and synthetic and mixed spun fibers thereof. Another object is to provide a process for producing said resin.

Further objects will be apparent from the following description.

In order to accomplish these objects, the present invention provides novel N-methylolated acrylamide telomer having the formula $$R^1-\underset{\underset{OH}{|}}{\overset{\overset{R^2}{|}}{C}}-\left[\begin{array}{c}CH_2-\underset{\underset{\underset{CH_2OH}{|}}{CONH}}{\overset{\overset{H}{|}}{C}}\end{array}\right]_x\left(CH_2-\underset{\underset{CONH_2}{|}}{\overset{\overset{H}{|}}{C}}\right)_y-H$$

wherein $R^1$ and $R^2$ are hydrogen or alkyl having 1 to 12 carbon atoms, $x$ and $y$ are integers and $(x+y)$ is an integer of from 2 to 30; and a process for producing said telomer, which comprises reacting an alcohol having the formula $$R^1-\underset{\underset{OH}{|}}{\overset{\overset{R^2}{|}}{C}}-H$$

wherein $R^1$ and $R^2$ have the same meanings as identified above, with acrylamide in the presence of a radical source catalyst, and reacting the resulting acrylamide telomer with formaldehyde in an aqueous condition at pH 7 to 11.

The process of the present invention is shown in the following equation:

$$R^1-\underset{\underset{OH}{|}}{\overset{\overset{R^2}{|}}{C}}-H + nCH_2=\underset{\underset{CONH_2}{|}}{\overset{\overset{H}{|}}{C}} \xrightarrow{\text{Radical source catalyst}}$$

$$R^1-\underset{\underset{OH}{|}}{\overset{\overset{R^2}{|}}{C}}-\left(CH_2-\underset{\underset{CONH_2}{|}}{\overset{\overset{H}{|}}{C}}\right)_n-H$$

$$R^1-\underset{\underset{OH}{|}}{\overset{\overset{R^2}{|}}{C}}-\left(CH_2-\underset{\underset{CONH_2}{|}}{\overset{\overset{H}{|}}{C}}\right)_n-H + mHCHO \longrightarrow$$

$$R^1-\underset{\underset{OH}{|}}{\overset{\overset{R^2}{|}}{C}}-\left[\begin{array}{c}CH_2-\underset{\underset{\underset{CH_2OH}{|}}{CONH}}{\overset{\overset{H}{|}}{C}}\end{array}\right]_x\left(CH_2-\underset{\underset{CONH_2}{|}}{\overset{\overset{H}{|}}{C}}\right)_y-H$$

wherein $R^1$ and $R^2$ are hydrogen or alkyl having 1 to 12 carbon atoms, $x$ and $y$ are integers and $n=(x+y)$ is an integer of from 2 to 30.

The polymerization degree of the acrylamide telomer and the proportion of the methylolated nitrogen can be easily controlled by selecting the reacting condition, whereby water-soluble thermosetting resin having the desired molecular weight and the desired number of re-active radicals (methylol radicals) is obtained.

The methylolation proportion, i.e.

$$\frac{x}{x+y}$$

is from 0.1 to 1.0 preferably 0.5 to 1.0.

Examples of the alcohol to be employed in the present invention include methanol, ethanol, n-propanol, isopropanol, n-butanol, isobutanol, n-octanol, isooctanol and n-dodecanol, among which isopropanol and isobutanol is preferably used.

Examples of radical source catalyst employed in the present invention include peroxide such as benzoyl peroxide, di-tert.-butyl peroxide, redox combination of these peroxide and tertiary amine such as dimethylaniline, and azo series catalyst such as azobisisobutyronitrile. In general, compounds which yield radical by self decomposition and do not cause induced decomposition, are effective.

The ratio of alcohol to acrylamide may be widely changed, and preferable range is between 1 to 100 parts by weight of alcohol per 1 part by weight of the amide.

Amount of the radical source catalyst is preferably 0.1 to 0.2 mole percent based on the moles of the alcohol.

It is convenient to conduct the reaction at a temperature within a range of higher than decomposition temperature of the radical source catalyst but not so higher temperature than the decomposition temperature, for example, a temperature range of from 75° to 85° C. is preferable in case benzoyl peroxide is used, a temperature range of from 100° C. to 130° C. is preferable in case di-tert.-butyl peroxide is used, 0° to 30° C. is preferable in case the redox catalyst is used, and 55° to 65° C. is preferable in case azobisisobutyronitrile is used.

The suitable reaction period of time is within a range of from 1 to 10 hours.

The polymerization degree is dependent upon the reaction condition, especially the amount and the kind of alcohol (telogen) to be used. In general higher the ratio of alcohol to amide is and the higher the alcohol is, the higher the polymerization degree is.

The reaction takes place in the form of the so-called telomerization, i.e., radical source catalyst is subjected to cause pyrolysis to produce a radical which draws out a hydrogen from alcohol to form an alcohol radical. The alcohol radical adds to the double bond of acrylamide to produce an alcohol addition acrylamide radical, which further adds to other acrylamide and grows up. The radical thus grown up causes a chain transfer to alcohol which is present in excess to produce acrylamide telomer and alcohol becomes radical to repeat the reaction.

After completion of reaction, the reaction mixture is filtered and the separated solid is washed with ether and dried to yield white powder of desired telomer, or the reaction mixture is concentrated in vacuo to remove alcohol and dissolved in water and the resulting aqueous solution is employed in the next methylolation reaction. The acrylamide telomer is water-soluble white powder having the softening point of 170°–200° C.

The thus obtained N-methylolated acrylamide telomer according to the following way.

0.2 to 2.5 moles of formaldehyde aqueous solution or formalin (about 5 to about 20 weight percent concentration) is reacted with 1 mole of acrylamide unit of acrylamide telomer aqueous solution (about 10 to about 30 weight percent concentration) in an alkaline condition (at pH 7 to 11) and at a temperature of from room temperature to about 60° C. for 1 to 2 hours. After the methylolation reaction the reaction mixture is diluted with water to make about 25% N-methylolated acrylamide telomer aqueous solution, which is further diluted with water when employed in the preparation of resin bath. In another way, after the methylolation reaction, the reaction mixture may be added with ethanol to precipitate the N-methylolated product, which is reprecipitated for several turns and purified with water-ethanol, and then washed with ethylether to obtain white powder.

The thus obtained N-methylolated acrylamide telomer is soluble in water and becomes insoluble upon subjecting to cross-linking reaction when heated in the presence of an acidic catalyst.

By employing the N-methylolated acrylamide telomer or N-methylolated methacrylamide telomer of the present invention as the textile finishing agent in the Pad-Dry-Cure-System, it is possible to impart various excellent properties such as high crease resistance, preferable feeding with thick touch to the textile fabrics of natural or synthetic fibers or mixed spun fibers thereof.

The following examples are given only by way of illustration of the present invention, and it is not intended to limit the present invention to the examples.

EXAMPLE 1

Into an autoclave a solution of 11.0 g. of acrylamide in 186.4 g. of isopropanol and 2.2 g. of di-tert.-butylperoxide are charged and air in the autoclave is replaced with nitrogen gas and then sealed. The autoclave is heated at 130° C. for 5 hours. The reaction mixtures gradually become white turbid and the resulting telomer precipitates. After the reaction is completed, the autoclave is cooled and the reaction mixture (slurry) is filtered to separate solid material, which is then washed with ethylether to remove contaminating impurity, and dried to yield 9.5 g. of acrylamide telomer. The telomer is white powder, having softening point, 121° C. Elementary analysis: N, 17.0 wt. percent, by Kieldahl method. Supposing the telomer having the formula of

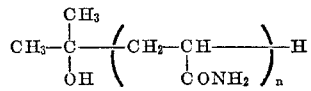

number of acrylamide units per telomer molecule is calculated to be 5.2, which corresponding to molecular weight 430, from the nitrogen analysis.

EXAMPLE 2

39.4 g. of acrylamide is dissolved in 166.5 g. of isopropanol, 2.2 g. of di-tert.-butylperoxide is added thereto, reaction and refining are conducted in an atmosphere of nitrogen in the similar way as in Example 1, to yield 41.0 g. of desired telomer.

Thus obtained product is telomer of 612 molecular weight having average addition of 7.8 moles of acrylamide units per mol.

EXAMPLE 3

17.9 g. of acrylamide is dissolved in 187.2 g. of n-butanol, 2.2 g. of di-tert.-butylperoxide is added thereto, and reaction and purification are conducted in the similar way as in Example 1. Thus obtained product is telomer of 728 molecular weight having average addition of 9.4 moles of acrylamide per mole.

EXAMPLE 4

55 g. of acrylamide is dissolved in 176 g. of n-butanol, 2.2 g. of di-tert.-butylperoxide is added thereto, and reaction and purification are conducted in an atmosphere of nitrogen in the similar way as in Example 1. The resultant product is telomer of 989 molecular weight having average addition of 12.9 moles of acrylamide per mole.

EXAMPLE 5

9.8 g. of acrylamide telomer obtained in Example 2 is made into a 20% aqueous solution, and the solution is added with 158 g. of 37% formalin and the pH of the mixture is adjusted at 8.5 by adding sodium hydroxide aqueous solution and the reaction is conducted at 60° C. for 30 minutes. The resultant reaction product is precipitated by adding ethanol thereto and then reprecipitated for several turns and purified with water-ethanol. The purified product is washed with ethylether to obtain white powder.

The white powder is added with phosphoric acid to decompose nitrogen-methylol bond and then generated formaldehyde is corrected by steam distillation and the formaldehyde is analyzed by iodine method. The white powder is found to be a 52% methylolated acrylamide telomer. When the methylolation is conducted under the same conditions for 2 hours, a 100% methylolated acrylamide telomer is produced. Methylolated telomer is completely cured and converted insoluble when heated for 5–10 minutes at 130° C. in the presence of ammonium phosphate, ammonium chloride, zinc nitrate and other acid catalysts.

EXAMPLE 6

To a 500 ml. glass flask equipped with a stirrer and reflux condenser 85.2 g. (1.2 mole) of acrylamide, 296.5 g. (4.0 mole) of n-butanol and 0.2 g. of benzoyl peroxide are charged. The mixture is stirred and gradually heated up to 85° C. and stirred for 2 hours at the same temperature. After the reaction is finished, 400 g. of water is added to the reaction mixture and n-butanol is removed with water azeotropically by heating up to 92° C. After n-butanol is completely removed, 102 g. of 37% formalin is added to the residue, and sodium hydroxide aqueous solution is added thereto to adjust the pH of the mixture to 9.5, and then reaction is conducted at 35° C. until free formalin in the reaction mixture becomes lower than 1.5% by analyzing ammonium chloride method.

The thus obtained N-methylolated acrylamide telomer is diluted with water to make the concentration 25%, the viscosity of the 25% aqueous solution is 250 centipoises at 25° C., which is further diluted with water to make the concentration of the resin 5%.

The 97.5 g. of the 5% resin solution is added with 2.5 g. of zinc nitrate to make resin bath. Cotton-polyester mixed spun fabric is dipped into the bath, squeezed and dried at 80° C. for 2 minutes, and cured at 150° C. for 3 minutes to obtain fabric having excellent wet crease resistance and filling.

EXAMPLE 7

284 g. of acrylamide is dissolved in 1,600 g. of methanol and 1 g. of azobisisobutyronitrile is added thereto and the telomerization reaction is conducted at 60° C. for 3 hours. The thus obtained telomer slurry is added with water and methanol is removed in vacuo. The residue is added with water to dissolve the telomer and 394 g. of 37.7% formalin is added thereto and then the solution is adjusted at pH 9 by adding sodium hydroxide aqueous solution. The methylolation reaction is conducted at 30° C. for 1 hour, 20 minutes to yield N-methylolated acrylamide telomer having methylolation degree 89%.

What we claim is:
1. A novel N-methylolated acrylamide telomer having the formula

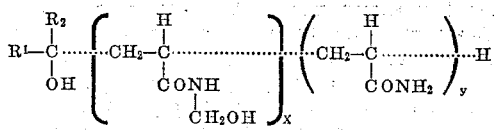

wherein $R^1$ and $R^2$ are hydrogen or alkyl having 1 to 12 carbon atoms, $x$ and $y$ are integers and $(x+y)$ is an integer of from 2 to 30.

2. A process for producing novel acrylamide telomer having the formula

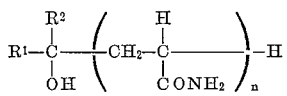

wherein $R^1$ and $R^2$ are hydrogen or alkyl having 1 to 12 carbon atoms, and $n$ is an integer of from 2 to 30, consisting essentially of reacting an alcohol having the formula

wherein $R^1$ and $R^2$ have the same meanings as identified above, with acrylamide in the presence of a radical source catalyst.

3. A process according to claim 2, wherein said alcohol is methanol, ethanol, n-propanol, isopropanol, n-butanol or isobutanol.

4. A process according to claim 2, wherein said radical source catalyst is benzoyl peroxide, di-tert.-butyl peroxide, combination of benzoyl peroxide and dimethylaniline, or azobisisobutyronitrile.

5. A process according to claim 2, wherein the ratio of said alcohol to said acrylamide compound is 1 to 100 parts by weight of alcohol per 1 part by weight of said acrylamide compound.

6. A process according to claim 2, wherein amount of said radical source catalyst is 0.1 to 0.2 mole percent based on the mole of said alcohol.

7. A process for producing N-methylolated acrylamide telomer of the formula

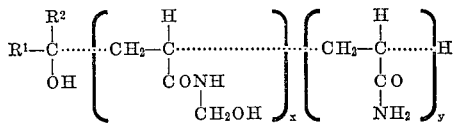

wherein $R^1$ and $R^2$ are hydrogen or alkyl having 1 to 12 carbon atoms, $x$ and $y$ are integers and $(x+y)$ is an integer of from 2 to 30, which comprises reacting formaldehyde with acrylamide telomer having the formula

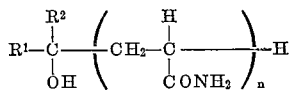

wherein $R^1$ and $R^2$ have the same meanings as identified above and $n$ is an integer of from 2 to 30, in an aqueous condition at pH 7 to 11.

8. A process according to claim 7, wherein amount of formaldehyde is 0.2 to 2.5 moles per mole of acrylamide compound units.

9. A process according to claim 7, wherein the reaction is effected at a temperature of from room temperature to about 60° C. for 1 to 2 hours.

10. A process according to claim 7, further comprising preparing the acrylamide telomer by reacting an alcohol having the formula

wherein $R^1$ and $R^2$ have the same meanings as identified above, with acrylamide in a nonaqueous medium in the presence of a radical source catalyst.

11. A novel N-methylolated methacrylamide telomer having the formula

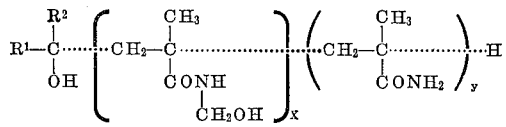

wherein $R^1$ and $R^2$ are hydrogen or alkyl having 1 to 12 carbon atoms, $x$ and $y$ are integers and $(x+y)$ is an integer of from 2 to 30.

References Cited

UNITED STATES PATENTS

| | | | |
|---|---|---|---|
| 2,486,191 | 10/1949 | Minsk et al. | 260—89.7 |
| 3,214,420 | 10/1965 | Hunt et al. | 260—72 |
| 3,366,605 | 1/1968 | Seiner | 260—72 |
| 3,368,999 | 2/1968 | Sekmakas et al. | 260—72 |
| 3,008,991 | 11/1961 | Simmons | 260—561 |

WILLIAM H. SHORT, Primary Examiner

E. WOODBERRY, Assistant Examiner

U.S. Cl. X.R.

260—29.7, 89.7, 561